United States Patent
Ikeda et al.

[11] Patent Number: 5,825,604
[45] Date of Patent: Oct. 20, 1998

[54] DEMAGNETIZATION CIRCUIT

[75] Inventors: Yutaka Ikeda, Youkaichi; Takayo Katsuki, Shiga-ken, both of Japan

[73] Assignee: Murata Manufacturing Co., Ltd., Japan

[21] Appl. No.: 964,163

[22] Filed: Nov. 4, 1997

Related U.S. Application Data

[63] Continuation of Ser. No. 665,581, Jun. 18, 1996, abandoned, which is a continuation of Ser. No. 518,243, Aug. 23, 1995, abandoned.

[30] Foreign Application Priority Data

Aug. 24, 1994 [JP] Japan ................................. 6-199792
Sep. 5, 1994 [JP] Japan ................................. 6-211368
Sep. 5, 1994 [JP] Japan ................................. 6-211369

[51] Int. Cl.⁶ ................................................ H01F 13/00
[52] U.S. Cl. ................................... 361/149; 361/267
[58] Field of Search ............................ 361/149–151, 361/267; 315/8

[56] References Cited

U.S. PATENT DOCUMENTS

| | | | |
|---|---|---|---|
| 3,562,614 | 2/1971 | Gramkow | 318/221 |
| 3,733,524 | 5/1973 | Cooksey | 361/150 |
| 3,944,870 | 3/1976 | Sutton, Jr. et al. | 315/8 |
| 4,445,072 | 4/1984 | Fredres | 315/8 |
| 4,504,817 | 3/1985 | Shikama et al. | 315/8 X |
| 4,829,214 | 5/1989 | Lendaro | 315/8 |

FOREIGN PATENT DOCUMENTS

| | | | |
|---|---|---|---|
| 59-92690(A) | 5/1984 | Japan | 361/150 |
| 60-192483(A) | 9/1985 | Japan | 361/150 |
| 60-233989(A) | 11/1985 | Japan | 361/150 |
| 1164786 | 9/1969 | United Kingdom | 361/150 |

*Primary Examiner*—Fritz Fleming
*Attorney, Agent, or Firm*—Ostrolenk, Faber, Gerb & Soffen, LLP

[57] ABSTRACT

In one example of a demagnetization (degaussing) circuit, main electrodes of a TRIAC, a first positive temperature characteristic thermistor and a demagnetization coil are connected in series to both ends of an AC supply, and a heat-sensitive switch and a heating resistor are connected in series between an end of the TRIAC on the side of the AC supply and an end of the demagnetization coil on the side of the AC supply. A connecting point between the heat-sensitive switch and the heating resistor is connected to a gate electrode of the TRIAC, and the heat-sensitive switch and the heating resistor are thermally coupled to each other. The disclosed demagnetization circuit does not need a secondary electric circuit such as a relay control circuit and allows easy substrate design, with a small number of components and at low cost. Furthermore, a demagnetization current sufficiently damps to the level causing no color misregistration and color unevenness on a screen of a color television receiver, from the time the color television receiver is powered on until the time a picture appears on the screen.

13 Claims, 8 Drawing Sheets

DEMAGNETIZATION CIRCUIT

This is a Continuation of application Ser. No. 08/665,581 filed Jun. 18, 1996, now abandoned, which is a Continuation of application Ser. No. 08/518,243, filed on Aug. 23, 1995, now abandoned.

BACKGROUND OF THE INVENTION

1. Field of the Invention

The present invention relates to a demagnetization circuit, and more particularly, to a demagnetization or degaussing circuit which is suitably used in a color television receiver to avoid color misregistration and color unevenness on a screen caused by the influence of the earth's magnetic field.

2. Description of the Related Art

Generally, in a color television receiver, a shadow mask is provided on the inside of a fluorescent member to guide electron beams in a cathode-ray tube to radiate onto respective predetermined positions of the fluorescent member. However, if the shadow mask is magnetized by the earth's magnetic field, the electron beams are refracted and are not radiated onto the predetermined positions of the fluorescent member, which causes color misregistration and color unevenness on a screen.

In order to avoid such magnetization of the shadow mask, a demagnetization circuit is generally used which demagnetizes the shadow mask by using a damped alternating field caused by the passage of a dwindling alternating current (demagnetization current) through a demagnetization coil located around a cathode-ray tube and which cuts off the current after the completion of demagnetization. It has also been suggested that a positive characteristic thermistor for generating heat and whose resistance increases when it is supplied with current can be used to obtain the demagnetization current and that a TRIAC can be used to cut off the current to the demagnetization coil after demagnetization. The TRTAC is, as is well known, a two-way three-terminal thyristor which is turned on when an absolute value of the current flowing into a gate electrode exceeds a predetermined value.

FIG. 13 is a circuit diagram of a demagnetization circuit disclosed in Japanese Laid-open Patent No. 61-38673, which is a first prior art example of such a demagnetization circuit, and FIG. 14 shows the waveform of a demagnetization current which flows when the demagnetization circuit is in operation. Referring to FIG. 13, a positive (temperature) characteristic thermistor 2, a demagnetization coil 3 and first and second main electrodes 5a and 5b of a TRIAC 5 are connected in series to both ends of an AC supply 1, and a resistor 6 is connected in parallel with the demagnetization coil 3 and the TRIAC 5. A resistor 7 is connected between a gate electrode 5c and the second main electrode 5b of the TRIAC 5, and a switch 4 is connected in series between the AC supply 1 and the positive characteristic thermistor 2.

In such configuration, when the switch 4 is closed, current flows into the gate electrode 5c of the TRIAC 5 through the resistor 7, the TRIAC 5 is turned on, and an alternating current flows between the main electrodes 5a and 5b thereof. The alternating current between the main electrodes 5a and 5b passes through the positive characteristic thermistor 2 and the demagnetization coil 3, and dwindles as the temperature of the positive characteristic thermistor 2 rises and the resistance value thereof increases, thereby causing a damped alternating field in the demagnetization coil 3.

On the other hand, as the temperature of the positive characteristic thermistor 2 rises and the resistance value thereof increases, the current flowing into the gate electrode 5c through the resistor 7 also decreases. When the current decreases to below the level required to keep the TRIAC 5 on, the TRIAC 5 is turned off. At this time, assuming that the resistance value of the resistor 6 is sufficiently smaller than the resistance of the positive characteristic thermistor 2 when the temperature of the positive characteristic thermistor 2 is high, the current still flows through the positive characteristic thermistor 2 after the TRIAC 5 is turned off. Therefore, the temperature and resistance of the positive characteristic thermistor 2 are kept high, and the OFF state of the TRIAC 5 is maintained. In addition to the aforesaid requirement, assuming that the resistance of the resistor 6 is set at a sufficiently higher value than that of the series circuit composed of the demagnetization coil 3 and the TRIAC 5 when the TRIAC 5 is ON, a demagnetization current having a damping waveform shown by a solid line in FIG. 14 flows through the demagnetization coil 3.

However, in the demagnetization circuit of the first prior art shown in FIG. 13, current leakage occurs along a path leading from the main electrode 5a of the TRIAC 5 to the gate electrode 5c and the resistor 7, causing a residual current having a waveform shown by a dotted line in FIG. 14 to flow through the demagnetization coil 3. As a result, a faint alternating field is still caused in the demagnetization coil 3 by the residual current, which causes jitter on a screen of a color television receiver.

Another prior art demagnetization circuit uses an electromagnetic relay instead of the TRIAC to cut off the current applied to the demagnetization coil after demagnetization. FIG. 15 is a circuit diagram of such a demagnetization circuit. In order to obtain a demagnetization current, a positive characteristic thermistor 2, a demagnetization coil 3 and an electromagnetic relay 55 are connected in series to both ends of an AC supply 1, and a relay control circuit 65 is connected to the coil of the electromagnetic relay 55. The relay control circuit 65 comprises a transistor 51, a diode 52, a resistor 53 and a pulse generating circuit 54. The connections between these components are well known, and the description thereof is omitted.

In such configuration, after a switch 4 connected to one end of the AC supply 1 is closed, when pulses generated by the pulse generating circuit 54 go to the high level, the transistor 51 is put into an on state, current flows through the electromagnetic relay 55, and the electromagnetic relay 55 is turned on. While the electromagnetic relay 55 is on, an alternating current from the AC supply 1 passes through the positive characteristic thermistor 2 and the demagnetization coil 3, and dwindles as the temperature of the positive characteristic thermistor 2 rises and the resistance value thereof increases, thereby causing a damped alternating field in the demagnetization coil 3.

When the pulses generated from the pulse generating circuit 54 return to the low level after the color television receiver is sufficiently demagnetized, the transistor 51 is put into an off state, no current flows through the resistor 53 to the electromagnetic relay 55, and therefore, the electromagnetic relay 55 is turned off. At this point, the demagnetization current passing through the demagnetization coil 3 is cut off.

In the demagnetization circuit of FIG. 15, no residual current owing to current leakage flows through the demagnetization coil 3. However, since the relay control circuit 65 including the pulse generating circuit 54 and other peripheral circuits is needed to control the operation of the electromagnetic relay 55, the number of components is large, which results in higher costs. Furthermore, the DC low-voltage relay control circuit 65 is required to be located near the circuit of the AC supply 1 while being electrically insulated and separated, and therefore, restrictions are placed on substrate design.

In addition to the above-mentioned problems, if the temperature of the positive characteristic thermistor 2 rises rapidly and the time taken for the resistance thereof to increase is short in the circuit of FIG. 13, the TRIAC 5 is turned off too early, and the damped alternating field cannot be maintained for a sufficiently long time, so that effective magnetization is impossible. Although this problem can be solved by employing a thermistor having a large heat capacity as the positive characteristic thermistor 2, the cost is increased. If the resistance of the positive characteristic thermistor 2 is set at a smaller value, the withstand voltage of the positive characteristic thermistor 2 is lowered.

On the other hand, if the temperature rise of the positive characteristic thermistor 2 is slow and the time taken for the resistance thereof to increase is long, in FIG. 15 as well as in FIG. 13, the time taken for the demagnetization current to sufficiently damp so that it does not cause color misregistration and color unevenness on the screen of the color television receiver is longer than the time from when the color television receiver is turned on to when a picture appears on the screen. Thus the picture appears on the screen before demagnetization is completed and the demagnetization current is cut off. In this case, the picture on the screen is distorted.

SUMMARY OF THE INVENTION

It is therefore a main object of the present invention to provide a demagnetization circuit, which can eliminate the influence of residual current by entirely cutting off current flowing through a demagnetization coil after a TRIAC is turned off and demagnetization is completed, at low cost, or in other words, to provide a demagnetization circuit in which a secondary electric circuit such as a relay control circuit is not needed to cut off the residual current, in which the number of components is small and in which the design of a substrate is easy.

It is another object of the present invention to provide a demagnetization circuit which can be adjusted to extend the damping time of a demagnetization current without rewiring an increase in the heat capacity of a positive characteristic thermistor or a decrease in the resistance value thereof when the damping time of the demagnetization current is not enough for effective demagnetization.

It is a further object of the present invention to provide a demagnetization circuit which can sufficiently damp a demagnetization current before a picture appears on a screen of a color television receiver, so that a disordered picture does not appear on the screen before the demagnetization current is cut off owing to an excessively long damping time of the demagnetization current.

In order to achieve the above objects, according to an aspect of the present invention, there is provided a demagnetization circuit wherein a main electrode of a TRIAC, a first positive characteristic thermistor and a demagnetization coil are connected in series to both ends of an AC supply and a second positive characteristic thermistor is connected between a gate electrode of the TRIAC and the AC supply side of the demagnetization coil.

An initial resistance value of the second positive characteristic thermistor is set such that the TRIAC is turned off on or near a zero-crossing of an alternating current generated by the AC supply.

According to another aspect of the present invention, a first positive characteristic thermistor, a main electrode of a TRIAC, and a demagnetization coil are connected in series to both ends of an AC supply and a resistor is connected between a gate electrode of the TRIAC and the AC supply side of the demagnetization coil.

Furthermore, a second positive characteristic thermistor is thermally coupled to the first positive characteristic thermistor. The second positive characteristic thermistor is connected between the AC supply side of the first positive characteristic thermistor and the AC supply side of the resistor.

According to a further aspect of the present invention, a main electrode of a TRIAC, a first positive characteristic thermistor and a demagnetization coil are connected in series to both ends of an AC supply, a heat-sensitive switch and a heating resistor are connected in series between the AC supply side of the TRIAC and the AC supply side of the demagnetization coil, a connecting point between the heat-sensitive switch and the heating resistor is connected to the gate electrode of the TRIAC, and the heat-sensitive switch and the heating resistor are thermally coupled to each other.

A second positive characteristic thermistor may be connected between an end of the TRIAC on the side of the first positive characteristic thermistor and an end of the demagnetization coil on the side of the AC supply, the first positive characteristic thermistor and the second positive characteristic thermistor being thermally coupled to each other.

According to the present invention, the current applied to the demagnetization coil is entirely cut off after the completion of demagnetization without using a secondary electric circuit such as a relay control circuit.

Furthermore, the damping time of the demagnetization current may be extended by using a demagnetization current waveform in which a part having a small absolute value is set to zero.

Still further, by increasing the rate of temperature rise of the positive characteristic thermistors by thermally coupling the positive characteristic thermistors, the damping time of the demagnetization current may be shortened.

Other features and advantages of the present invention will become apparent from the following description of the invention which refers to the accompanying drawings.

DETAILED DESCRIPTION OF EMBODIMENTS OF THE INVENTION

Several preferred embodiments of a demagnetization circuit according to the present invention will now be described with reference to the drawings.

Figure 1:
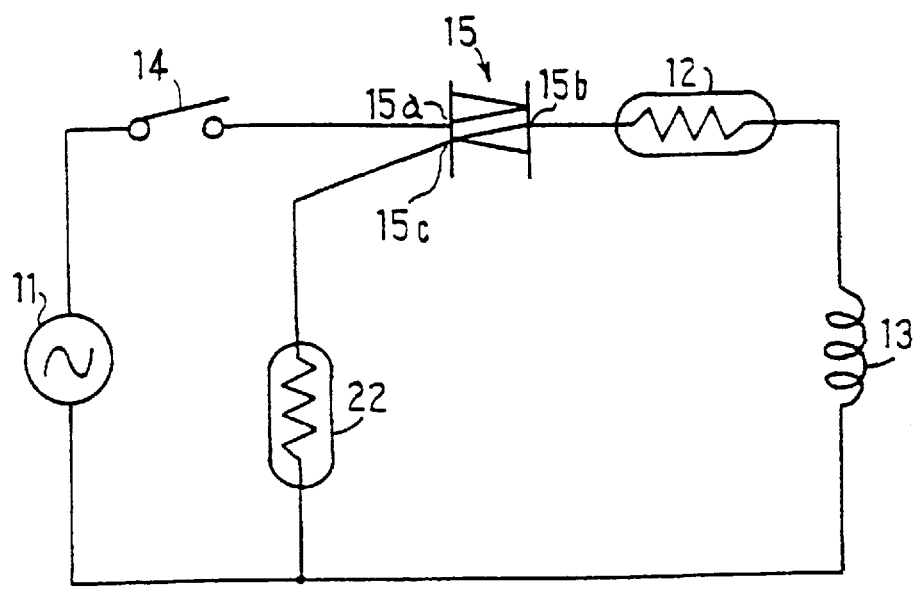
FIG. 1 is a circuit diagram of a demagnetization circuit according to a first embodiment of the present invention.
Figure 2:
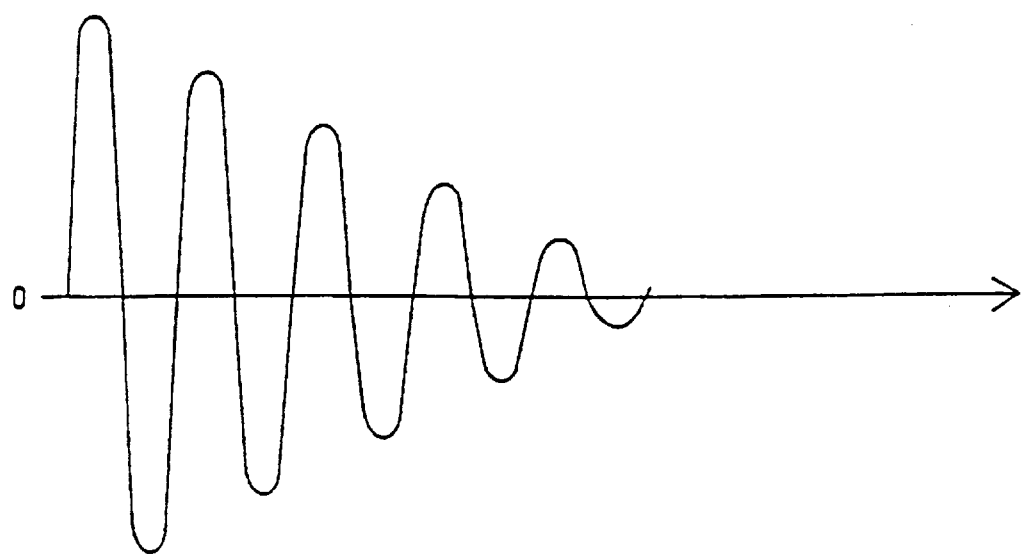
FIG. 2 shows a waveform of a current passing through the demagnetization circuit in the first embodiment of the present invention.

FIG. 1 shows a demagnetization circuit according to a first embodiment of the present invention, and FIG. 2 shows a waveform of a demagnetization current flowing when the demagnetization circuit is in operation. Referring to FIG. 1, main electrodes 15a and 15b of a TRIAC 15, a first positive temperature characteristic thermistor 12 and a demagnetization coil 13 are connected in series to both ends of an AC supply 11, and a second positive temperature characteristic thermistor 22 is connected between a gate electrode 15c of the TRIAC 15 and one end of the demagnetization coil 13 on the side of the AC supply 11.

In such configuration, when a switch 14 connected to the AC supply 11 is closed, a current flows to the gate electrode 15c of the TRIAC 15 through the second positive characteristic thermistor 22, thereby turning on the TRIAC 15. In response to the turning-on of the TRIAC 15, an alternating current flows through the first positive characteristic thermistor 12 and the demagnetization coil 13. As the temperature of the first positive characteristic thermistor 12 rises and the resistance value thereof increases, the alternating current flowing through the demagnetization coil 13 dwindles, which causes damping of the alternating field in the demagnetization coil 13. After that, as the resistance value of the second positive characteristic thermistor 22 continues to increase, the current flowing to the gate 15c of the TRIAC 15 also dwindles. When the current decreases below the level required to keep the TRIAC 15 on, the TRIAC 15 is turned off and the current applied to the demagnetization coil 13 is cut off. Since the current still flows through the second positive characteristic thermistor 22 after the TRIAC 15 is turned off, the temperature of the second positive characteristic thermistor 22 is kept high and the resistance value thereof is also kept high. Therefore, the TRIAC 15 also maintains its off state.

In the demagnetization circuit of this embodiment, the current applied to the positive characteristic thermistor 22 continues to flow over a path which bypasses the demagnetization coil 13 after the TRIAC 15 is turned off and the demagnetization is completed. Therefore, the current flowing through the demagnetization coil 13 is cut off after the TRIAC 15 is turned off. As a result, as shown in FIG. 2, no residual current arises in the demagnetization current. Further, since the gate electrode 15c is located on the same side as the main electrode 15a, and the demagnetization coil 13 is coupled to the main electrode 15b, any leakage current flowing between the main electrode 15a and the gate electrode 15c does not flow through the demagnetization coil 13.

If the initial resistance of the second positive characteristic thermistor 22 is set at such a value that the TRIAC 15 is turned off on or near a zero-crossing of the alternating current flowing through the circuit, the waveform of the demagnetization current flowing through the demagnetization coil 13 is partially cut. More specifically, if the initial resistance of the second positive characteristic thermistor 22 is set at such a value that a predetermined current for keeping the TRIAC 15 on is prohibited from flowing through the gate electrode 15c of the TRIAC 15 on and near a zero-crossing of the alternating current flowing through the circuit, the TRIAC 15 is temporarily turned off when the absolute value of the demagnetization current is small, and at this time, the demagnetization current flowing through the first positive characteristic thermistor 12 and the demagnetization coil 13 is cut off.

Figure 3:
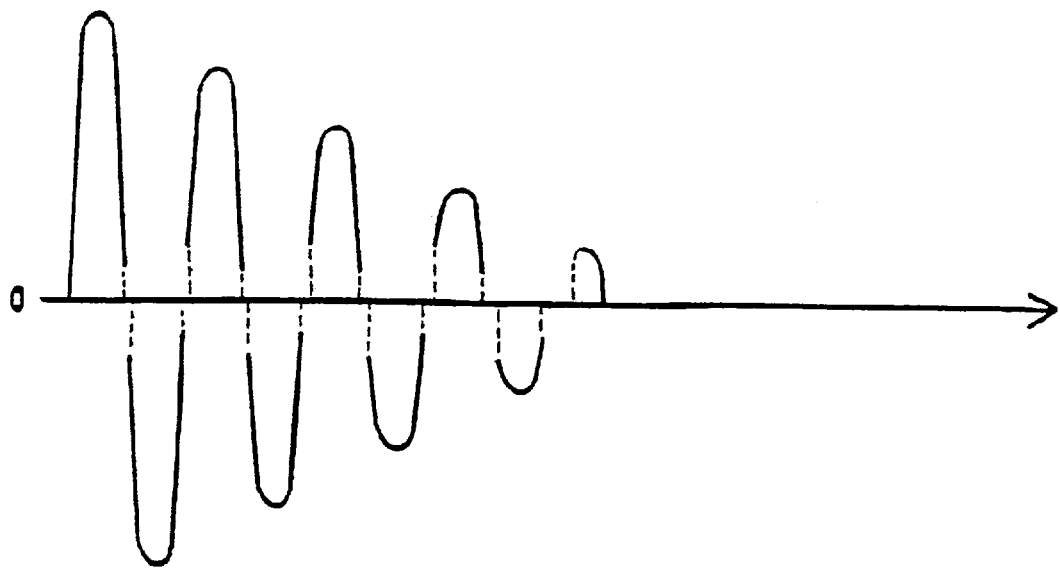
FIG. 3 shows an alternate waveform of a current passing through the demagnetization circuit in the first embodiment of the present invention.

FIG. 3 shows an alternative damping waveform of the demagnetization current flowing through the demagnetization coil 13 in the demagnetization circuit of the first embodiment. As shown by the dotted vertical line segments in FIG. 3, the demagnetization current falls to 0 when the TRIAC 15 is temporarily turned off. While the TRIAC 15 is on, the color television receiver is demagnetized by the demagnetization current having the waveform shown in FIG. 3.

The use of the current having the waveform shown in FIG. 3 allows the power to be supplied to the first positive characteristic thermistor 12 to be decreased without changing the maximum value of the demagnetization current. This makes it possible to slow down the heating of the first positive characteristic thermistor 12, and to slow down the operation thereof. As a result, the damping time of the demagnetization current is extended.

Figure 4:
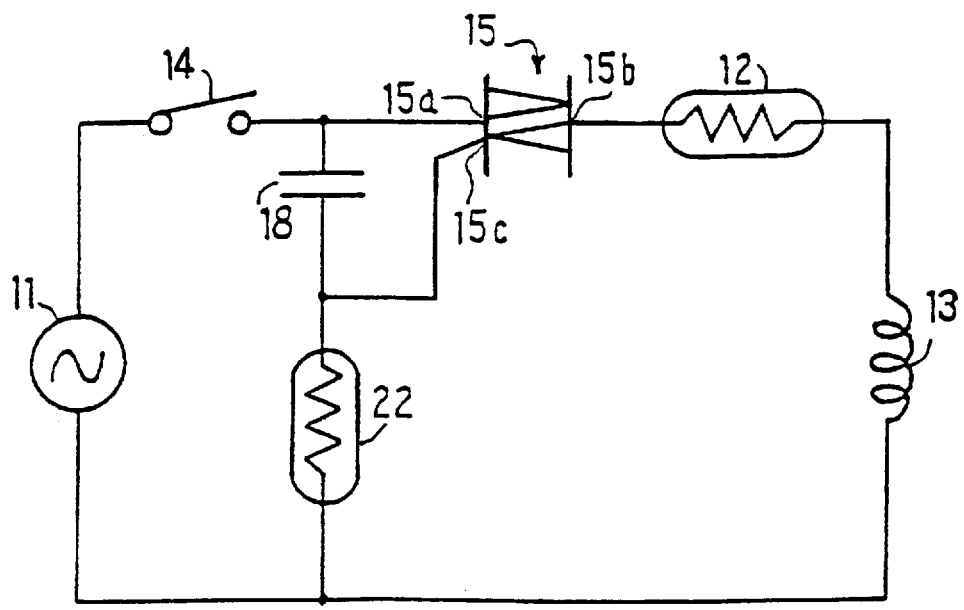
FIG. 4 is a circuit diagram of a demagnetization circuit according to a variation of the first embodiment of the present invention.

FIG. 4 shows a demagnetization circuit which is a variation of the first embodiment. Components corresponding to those in the demagnetization circuit shown in FIG. 1 are denoted by the same numerals, and the description thereof is omitted. Referring to FIG. 4, a capacitor 18 is connected between a main electrode 15a and a gate electrode 15c of a TRIAC 15, and serves to avoid malfunctions of the demagnetization circuit, by preventing noise caused by an AC supply 11 from flowing toward the TRIAC 15.

Figure 5:
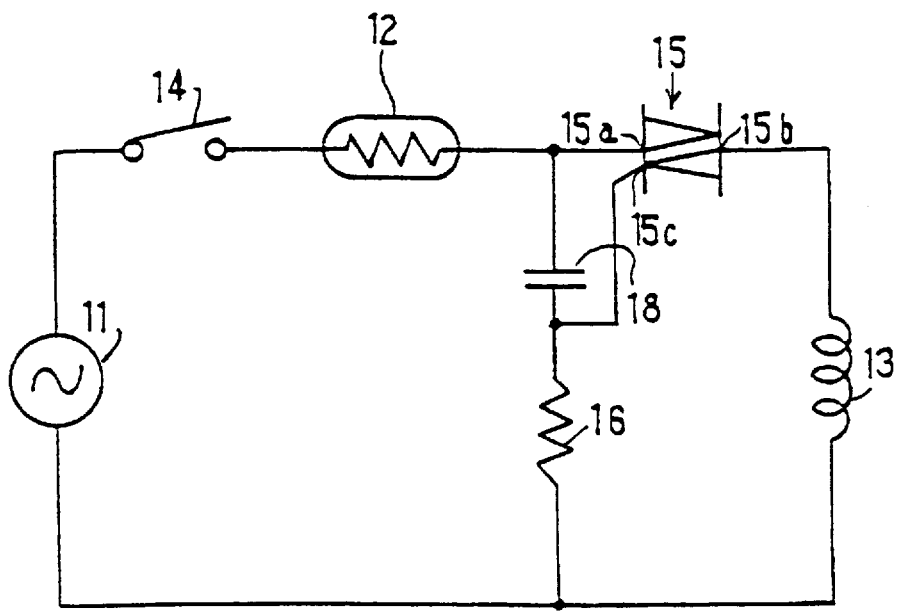
FIG. 5 is a circuit diagram of a demagnetization circuit according to a second embodiment of the present invention.
Figure 6:
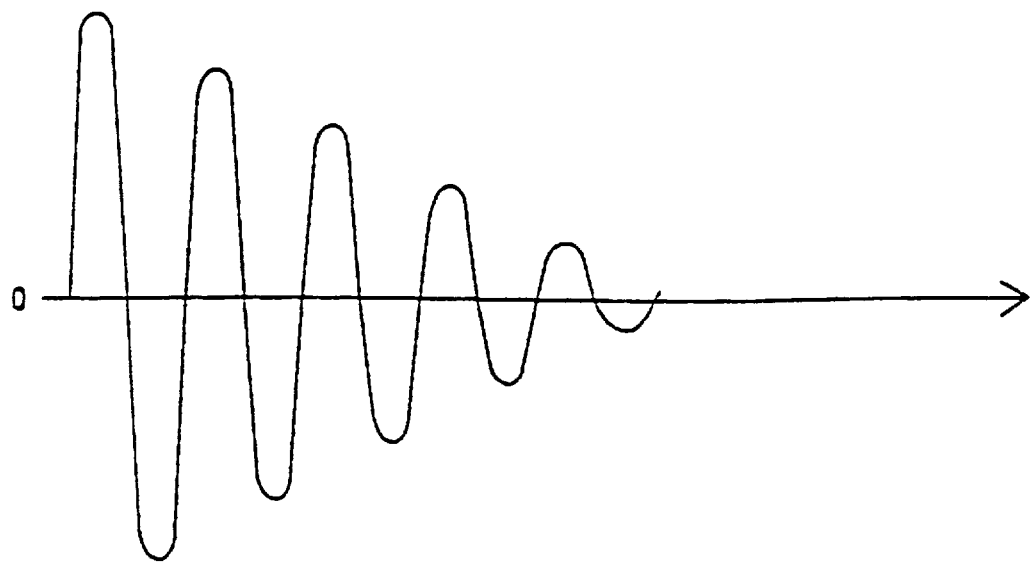
FIG. 6 shows a waveform of a current passing through a demagnetization coil in the second embodiment of the present invention.

FIG. 5 is a circuit diagram of a demagnetization circuit according to a second embodiment of the present invention, and FIG. 6 shows a waveform of a demagnetization current flowing when the demagnetization circuit is in operation. Components corresponding to those in the demagnetization circuits shown in FIGS. 1 and 4 are denoted by the same numerals, and the description thereof is omitted.

In the demagnetization circuit shown in FIG. 5, a resistor 16, instead of the second positive characteristic thermistor 22 used in the demagnetization circuits shown in FIGS. 1 and 4, is connected between a gate electrode 15c of a TRIAC 15 and one end of a demagnetization coil 13 on the side of an AC supply 11, and a first positive characteristic thermistor 12 is not positioned between a main electrode 15b of the TRIAC 15 and the demagnetization coil 13, but between the AC supply 11 and a main electrode 15a of the TRIAC 15. A capacitor 18 is connected between the main electrode 15a and the gate electrode 15c of the TRIAC 15 in a similar manner to the variation of the first embodiment shown in FIG. 4 to prevent noise caused by the AC supply 11 from flowing toward the TRIAC 15, thereby avoiding malfunctioning of the demagnetization circuit.

In such configuration, when a switch 14 connected to one end of the AC supply 11 is closed, a current flows to the gate electrode 15c of the TRIAC 15 through the first positive characteristic thermistor 12 and the resistor 16, by which the TRIAC 15 is turned on and an alternating current flows to the demagnetization coil 13. As the temperature of the first positive characteristic thermistor 12 is raised and the resistance thereof is increased by the passage of the current therethrough, the alternating current flowing to the demagnetization coil 13 dwindles, which causes a damped alternating field in the demagnetization coil 13. After that, the current applied to the gate electrode 15c also dwindles because of the increase in resistance of the first positive characteristic thermistor 12. When the current decreases below the level required to activate the TRIAC 15, the TRIAC 15 is turned off and the demagnetization current applied to the demagnetization coil 13 is cut off.

At this time, since the current still flows through the first positive characteristic thermistor 12 after the TRIAC 15 is turned off, the temperature of the first positive characteristic thermistor 12 is kept high, and the resistance thereof is also kept high. Therefore, the TRIAC 15 maintains its off state. As a result, a demagnetization current having a damping waveform shown in FIG. 6 passes through the demagnetization coil 13.

In other words, in the demagnetization circuit of the second embodiment, after the TRIAC 15 is turned off and the demagnetization current applied to the demagnetization coil 13 is cut off, the current still passing through the circuit flows over a path which bypasses the demagnetization coil 13. Therefore, after the TRIAC 15 is turned off, the current applied to the demagnetization coil 13 is cut off, and thereby, no residual current arises in the demagnetization current as shown in FIG. 6.

Figure 7:
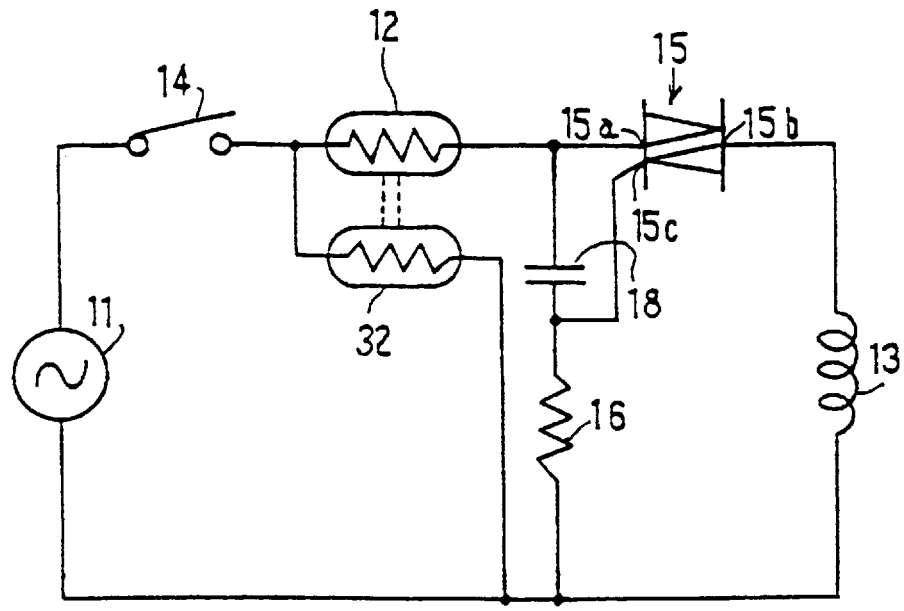
FIG. 7 is a circuit diagram of a demagnetization circuit according to a third embodiment of the present invention.
Figure 8:
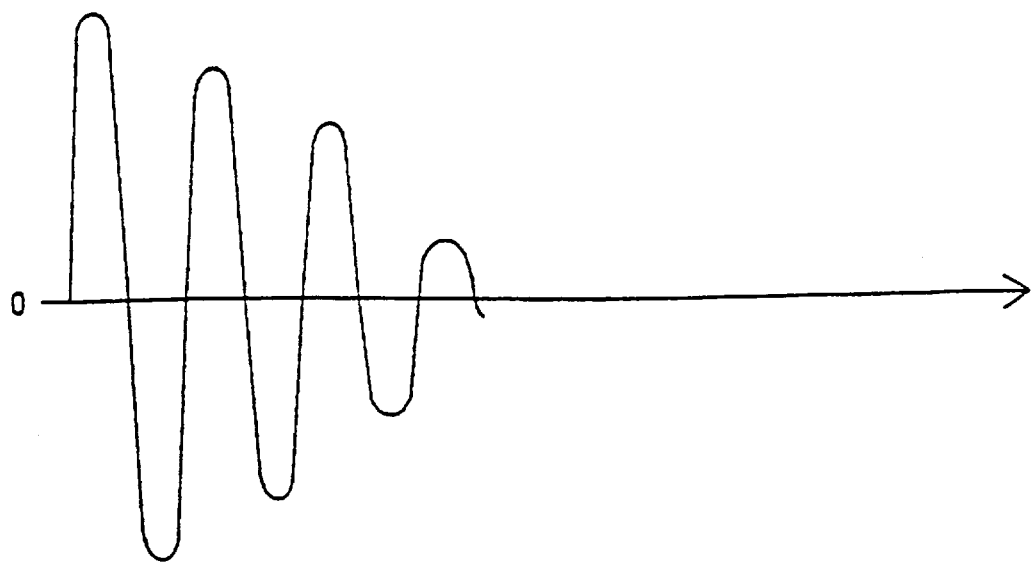
FIG. 8 shows a waveform of a current passing through a demagnetization coil in the third embodiment of the present invention.

FIG. 7 is a circuit diagram of a demagnetization circuit according to a third embodiment of the present invention, and FIG. 8 shows a waveform of a demagnetization current flowing when the demagnetization circuit is in operation. Components corresponding to those in the demagnetization circuit shown in FIG. 5 are denoted by the same numerals, and the description thereof is omitted.

In the demagnetization circuit shown in FIG. 7, a second positive characteristic thermistor 32 is connected between a connection point of a switch 14 and a first positive characteristic thermistor 12, and a connection point of a demagnetization coil 13 and an AC supply 11, in addition to the configuration of the demagnetization circuit shown in FIG. 5. The first positive characteristic thermistor 12 and the second positive characteristic thermistor 32 are thermally coupled to each other.

In such configuration, since current still flows through the second positive characteristic thermistor 32 and the temperature thereof is kept high even after the TRIAC 15 is turned off, the temperature and resistance of the first positive characteristic thermistor 12 thermally coupled to the second positive characteristic thermistor 32 are also kept high. Therefore, once the TRIAC 15 is turned off, it is not turned on again as long as the current is still applied. As a result, no current is applied to the demagnetization coil 13.

Furthermore, since the first positive characteristic thermistor 12 is thermally coupled to the second positive characteristic thermistor 32, the time taken for the temperature of the first positive characteristic thermistor 12 to rise is shortened, and the time taken for the resistance value thereof to increase is also shortened. As a result, the waveform of the demagnetization current in this embodiment damps sharply in the latter half (corresponding to the right side of the waveform) as shown in FIG. 8, and the damping time is shortened.

The time taken for the demagnetization current to sufficiently damp, to a level that causes no color misregistration and color unevenness on the screen of the color television receiver, can be made shorter than the time from when the color television receiver is powered on to when a picture appears on the screen. Accordingly, the picture does not appear on the screen of the color television receiver before the completion of demagnetization, so distortion of the picture can be avoided.

In the demagnetization circuits in the second and third embodiments, the TRIAC 15 is controlled to turn on and off in accordance with the changes in resistance of the first positive characteristic thermistor 12. In response to the resistance changes, the value of the current flowing through the gate electrode 15c of the TRIAC 15 changes, and the value of the demagnetization current flowing through the demagnetization coil 13 also changes. In short, there is a predetermined relationship between the current applied to the gate electrode 15c of the TRIAC 15 and the demagnetization current flowing through the demagnetization coil 13, and the TRIAC 15 is turned off when the demagnetization current is at a predetermined value. Furthermore, the first positive characteristic thermistor 12 is always being heated even after the completion of demagnetization as long as the switch 14 is closed, and the resistance value thereof is high. Therefore, even if too large a noise current passes into the TRIAC 15 and an improper trigger is applied to the TRIAC 15, the demagnetization current flowing through the demagnetization coil 13 is small, which does not disturb pictures on the screen of the color television receiver.

Figure 9:
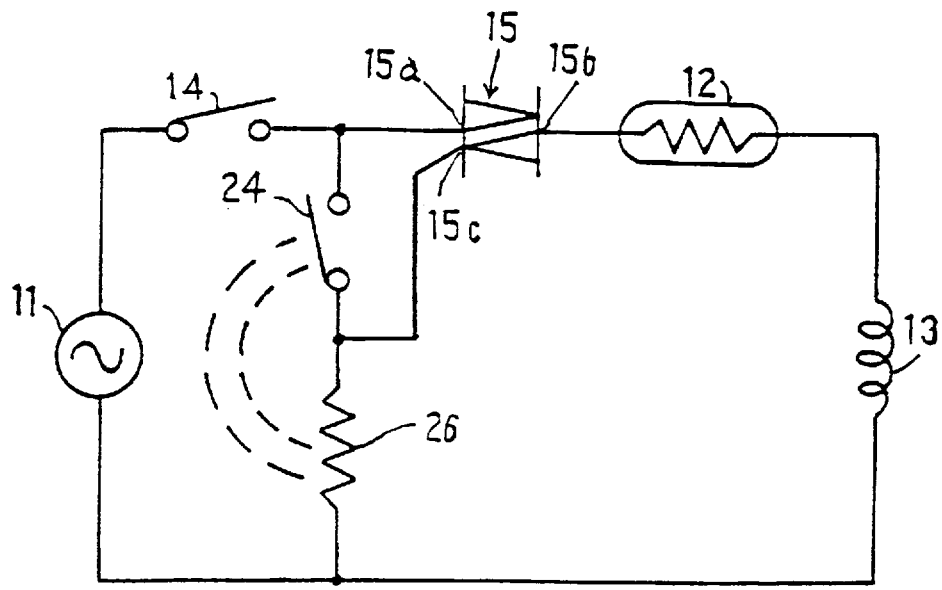
FIG. 9 is a circuit diagram of a demagnetization circuit according to a fourth embodiment of the present invention.
Figure 10:
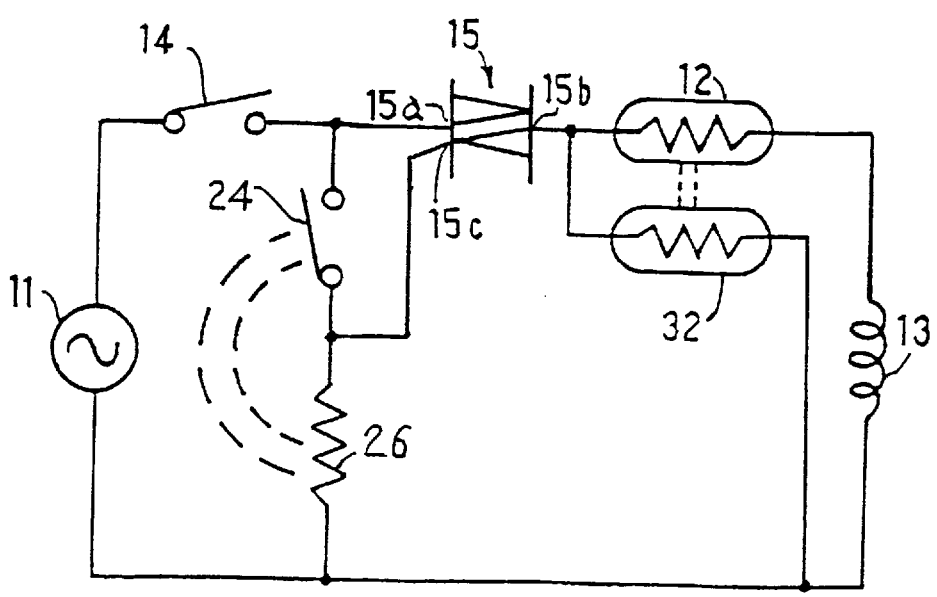
FIG. 10 shows a waveform of a current passing through the demagnetization circuit in the fourth embodiment of the present invention.

FIG. 9 is a circuit diagram of a demagnetization circuit according to a fourth embodiment of the present invention, and FIG. 10 shows a waveform of a demagnetization current flowing when the demagnetization circuit is in operation. In FIG. 9, components corresponding to those in the demagnetization circuit shown in FIG. 1 are denoted by the same numerals, and the description thereof is omitted.

In the demagnetization circuit shown in FIG. 9, instead of the second positive characteristic thermistor 22 in the demagnetization circuit shown in FIG. 1, a heating resistor 26 is connected between a gate electrode 15c of a TRIAC 15 and one end of a demagnetization coil 13 on the side of an AC supply 11, a heat-sensitive switch 24 is connected between a main electrode 15a of the TRIAC 15 and one end of the heating resistor 26 on the side of the gate electrode 15c, and the heating resistor 26 and the heat-sensitive switch 24 are thermally coupled to each other. The heating resistor 26 may be, for example, a positive characteristic thermistor.

In such configuration, when a power switch 14 connected to one end of the AC supply 11 is closed, current flows into the gate electrode 15c of the TRIAC 15 through the heating resistor 26, the TRIAC 15 is turned on, and an alternating current flows through a first positive characteristic thermistor 12 and the demagnetization coil 13. As the temperature of the first positive characteristic thermistor 12 is raised and the resistance value thereof is increased by the passage of the current therethrough, the alternating current dwindles, by which a damped alternating field is caused in the demagnetization coil 13.

On the other hand, the heating resistor 26 generates heat in response to the current flowing through the gate electrode 15c of the TRIAC 15, and heats the heat-sensitive switch 24. When the temperature of the heat-sensitive switch 24 rises to the normal operating temperature of the color television receiver after it is sufficiently demagnetized, the heat-sensitive switch 24 is closed to cause a short between the main electrode 15a and the gate electrode 15c of the TRIAC 15. The TRIAC 15 is thereby turned off, and the demagnetization current applied to the demagnetization coil 13 is cut off.

Since the current still flows through the heating resistor 26 after the TRIAC 15 is turned off, the temperature of the heating resistor 26 is kept high. Therefore, the closed state of the heat-sensitive switch 24 is also maintained, and a demagnetization current having a damping waveform shown in FIG. 10 passes through the demagnetization coil 13.

Figure 11:
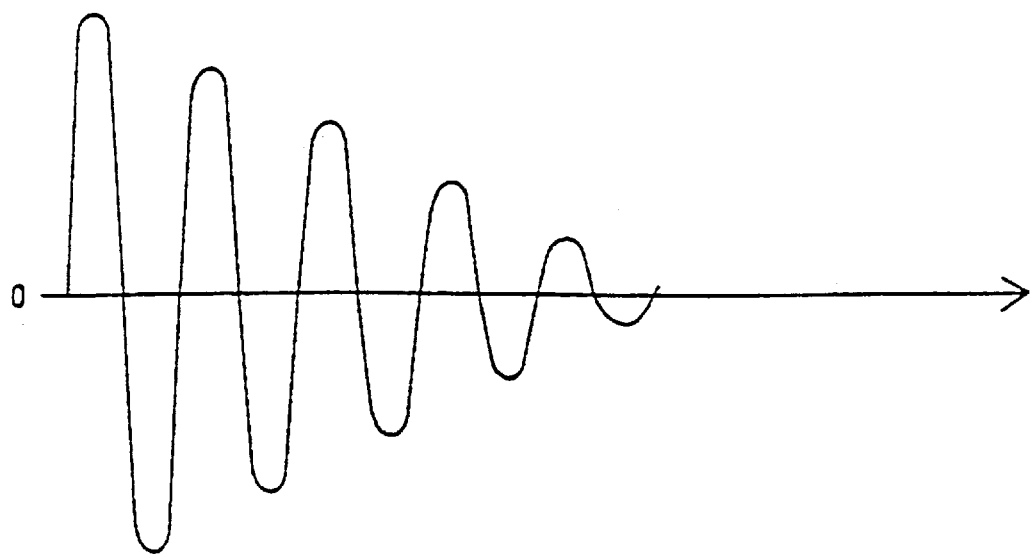
FIG. 11 is a circuit diagram of a demagnetization circuit according to a fifth embodiment of the present invention.
Figure 12:
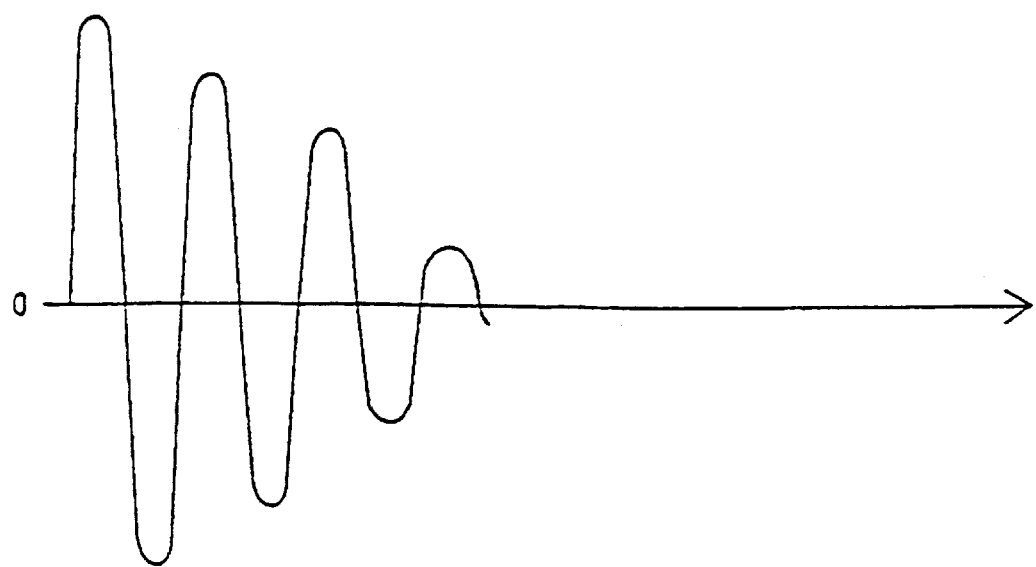
FIG. 12 shows a waveform of a current passing through the demagnetization circuit in the fifth embodiment of the present invention.
Figure 13:
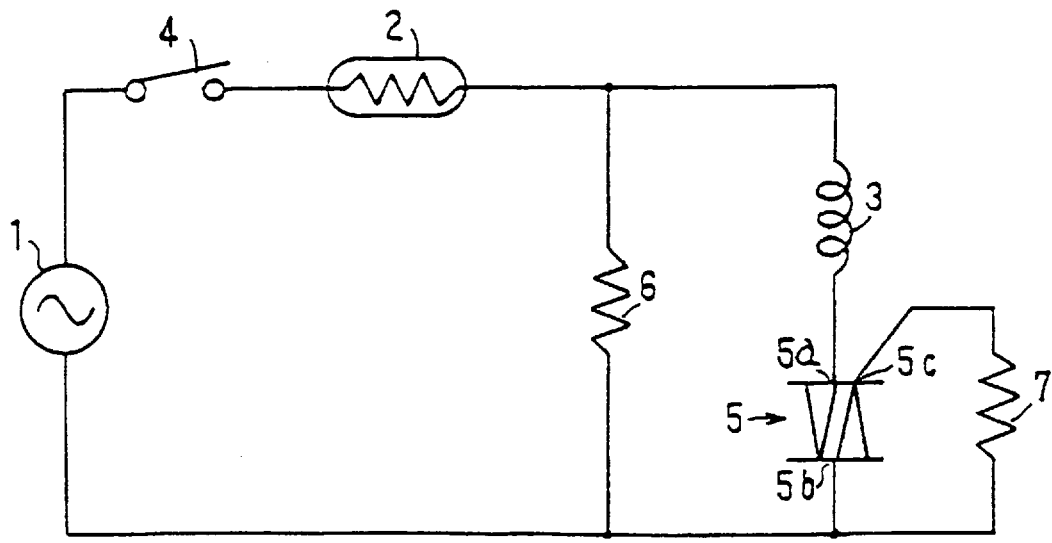
FIG. 13 is a circuit diagram of a first prior art demagnetization circuit.
Figure 14:
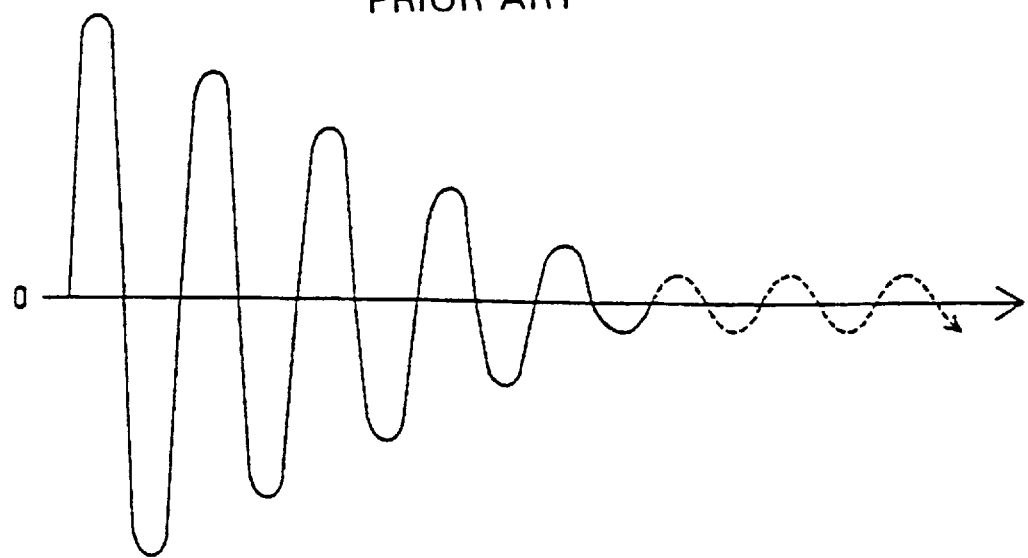
FIG. 14 shows a waveform of a current passing through the first prior art demagnetization circuit.
Figure 15:
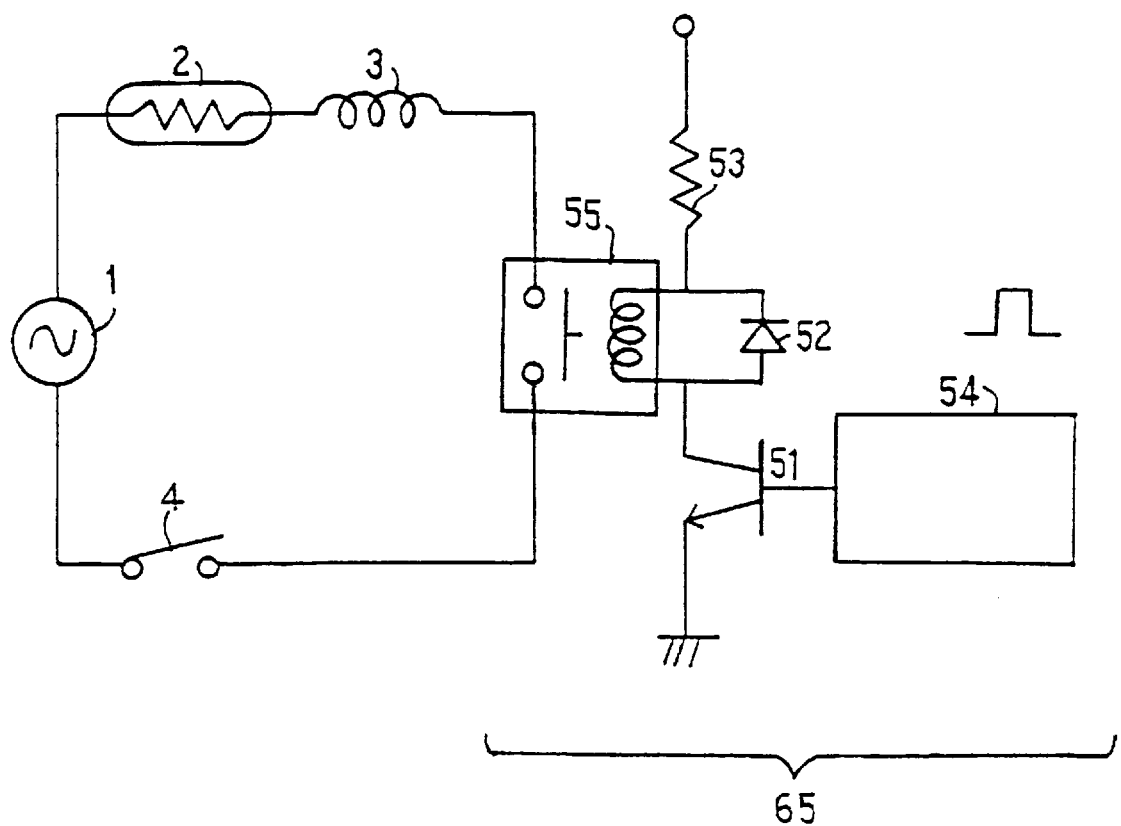
FIG. 15 is a circuit diagram of a second prior art demagnetization circuit.

FIG. 11 is a circuit diagram of a demagnetization circuit according to a fifth embodiment of the present invention, and FIG. 12 shows a waveform of a demagnetization current flowing when the demagnetization circuit is in operation. In FIG. 11, components corresponding to those in the demagnetization circuits shown in FIGS. 7 and 9 are denoted by the same numerals, and the description thereof is omitted.

In the demagnetization circuit shown in FIG. 11, besides the configuration of the demagnetization circuit shown in FIG. 9, a second positive characteristic thermistor 32 is connected between an end of a TRIAC 15 on the side of a first positive characteristic thermistor 12 and an end of a demagnetization coil 13 on the side of an AC supply 11, and the first positive characteristic thermistor 12 and the second positive characteristic thermistor 32 are thermally coupled to each other.

In such configuration, since the first positive characteristic thermistor 12 is thermally coupled to the second positive characteristic thermistor 32, the time taken for the temperature of the first positive characteristic thermistor 12 to rise is shortened, and the time taken for the resistance value thereof to increase is also shortened. As a result, a demagnetization current flowing through the demagnetization coil 13 rapidly dwindles in a damping waveform shown in FIG. 12 which is temporally shortened.

Thereby, similar to the third embodiment, the time taken for the demagnetization current to sufficiently damp, to a level that causes no color misregistration and color unevenness on the screen of the color television receiver, can be made shorter than the time from when the color television receiver is powered on until when a picture appears on the screen. Accordingly, no picture appears on the screen of the color television receiver before the completion of demagnetization, and distortion of the screen can be avoided.

As described above, according to the present invention, it is possible to provide a demagnetization circuit which can cut off a current flowing through a demagnetization coil after the completion of demagnetization of a color television receiver without using an electromagnetic relay and a relay control circuit including a pulse generating circuit and other peripheral circuits which have been used before. Therefore, it is possible to provide a demagnetization circuit, which can avoid jitter on a screen resulting from a residual current flowing through a demagnetization coil, with a small number of components and at low cost. Furthermore, since it is unnecessary to locate a DC low-voltage relay control circuit, separated and insulated, near an AC supply, no restrictions are placed on substrate design.

If the damping time of the demagnetization current is too short to achieve an effective demagnetization, it can be extended as in the embodiment shown in FIG. 3, for example, by using a demagnetization current waveform in which a part having a small absolute value is set to zero, without changing the heat capacity of a first positive characteristic thermistor or the initial resistance value thereof in operation. In short, the damping time of the demagnetization current can be extended without decreasing the maximum demagnetization current or lowering the withstand voltage of the positive characteristic thermistor.

Furthermore, if the damping time of the demagnetization current is too long, causing a distorted picture to appear on the screen of the color television receiver before the demagnetization current is cut off, the time taken for the demagnetization current to sufficiently damp, to a level causing no color misregistration and unevenness, can be made shorter than the time from when the color television receiver is powered on until when a picture appears on the screen, by thermally coupling the first and second positive characteristic thermistors to accelerate the increase in resistance of the first positive characteristic thermistor. Accordingly, no picture appears on the screen of the color television receiver before the completion of demagnetization, and distortion on the screen can be avoided.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A demagnetization circuit comprising:
   a series connection of a TRIAC having a pair of main electrodes and a gate electrode, a first positive characteristic thermistor, and a demagnetization coil, connected in series across an AC supply which provides an AC supply current, for supplying a demagnetizing current to said demagnetization coil; and
   a second positive characteristic thermistor connected between the gate electrode of the TRIAC and a connection point of the AC supply and the demagnetization coil for supplying a control current to said gate electrode, said second positive characteristic thermistor having a predetermined resistance characteristic for providing a predetermined control current to said gate electrode, so that said TRIAC is maintained turned off within a predetermined time interval of a zero-crossing of said AC supply current and so that said demagnetizing current is set to zero during said time interval.

2. A demagnetization circuit according to claim 1, further comprising a capacitor connected between said first main electrode and said gate electrode.

3. A demagnetization circuit comprising:
   a series connection of a TRIAC having a pair of main electrodes and a gate electrode, a first positive characteristic thermistor and a demagnetization coil, connected in series across an AC supply;
   a series connection of a heat-sensitive switch and a heating resistor connected in series between an end of said TRIAC on a side toward said AC supply and an end of said demagnetization coil on a side toward said AC supply;
   a connecting point between said heat-sensitive switch and said heating resistor being connected to the gate electrode of said TRIAC; and
   said heat-sensitive switch and said heating resistor being thermally coupled to each other.

4. A demagnetization circuit according to claim 3, further comprising a second positive characteristic thermistor connected between a connection point of said TRIAC and said first positive characteristic thermistor, and a connection point of the demagnetization coil and said AC supply;

said first positive characteristic thermistor and said second positive characteristic thermistor being thermally coupled to each other.

5. A demagnetization circuit, comprising:

a demagnetization coil;

an energizing circuit for energizing said demagnetization coil for a predetermined period of time after a power source is connected to said circuit, said circuit including a TRIAC which supplies current to said demagnetization coil to energize said demagnetization coil, said TRIAC including first and second main electrodes and a gate electrode located on the same side of said TRIAC as said first main electrode and wherein said demagnetization coil is coupled to said second main electrode so that any leakage current flowing between said first main electrode and said gate electrode does not flow through said demagnetization coil; and a positive temperature characteristic thermistor connected to said TRIAC in such a manner that said TRIAC is turned off after said predetermined period of time, said positive temperature coefficient thermistor being connected in series with said first main electrode of said TRIAC.

6. A demagnetization circuit according to claim 5, wherein said positive temperature coefficient thermistor is directly coupled to said first main electrode of said TRIAC.

7. A demagnetization circuit according to claim 5, further including a second positive temperature coefficient thermistor which receives current from said power source during the entire period of time that said power source is connected to said demagnetization circuit, said second positive temperature coefficient thermistor being in thermal communication with said first positive temperature coefficient thermistor to cause the temperature of said positive temperature coefficient thermistor to rise when current is flowing through said second positive temperature coefficient thermistor.

8. A demagnetization circuit according to claim 7, wherein said energizing circuit further includes a resistor connected to said gate electrode of said TRIAC and a capacitor connected between said first electrode and said gate electrode.

9. A demagnetization circuit according to claim 5, wherein said energizing circuit further includes a resistor connected to said gate electrode of said TRIAC and a capacitor connected between said first electrode and said gate electrode.

10. A demagnetization circuit, comprising:

a demagnetization coil;

an energizing circuit for energizing said demagnetization coil for a predetermined period of time after a power source is connected to said circuit, said circuit including a TRIAC which supplies current to said demagnetization coil to energize said demagnetization coil, said TRIAC including first and second main electrodes and a gate electrode located on the same side of said TRIAC as said first main electrode and wherein said demagnetization coil is coupled to said second main electrode circuit so that any leakage current flowing between said first main electrode and said gate electrode does not flow through said demagnetization coil; and a short circuit element for short circuiting said first main electrode and said gate electrode after said predetermined period of time.

11. A demagnetization circuit according to claim 10, wherein said short circuit element is a temperature sensitive switch.

12. A demagnetization circuit according to claim 11, wherein said demagnetization coil is connected to said second main electrode of said TRIAC in series with a positive temperature characteristic thermistor.

13. A demagnetization circuit according to claim 12, further including a second positive temperature characteristic thermistor connected in parallel with said series connection of said first positive temperature characteristic thermistor and said demagnetization coil, said positive temperature characteristic thermistor being in thermal communication with said first positive temperature characteristic thermistor.

* * * * *